US 8,869,269 B1

United States Patent
Ramzan et al.

(10) Patent No.: US 8,869,269 B1
(45) Date of Patent: Oct. 21, 2014

(54) METHOD AND APPARATUS FOR IDENTIFYING DOMAIN NAME ABUSE

(75) Inventors: Zulfikar Ramzan, Cupertino, CA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 1570 days.

(21) Appl. No.: 12/128,237

(22) Filed: May 28, 2008

(51) Int. Cl.
*G06F 21/00* (2013.01)
*H04L 29/06* (2006.01)
*H04L 29/12* (2006.01)

(52) U.S. Cl.
CPC ........ *H04L 63/1483* (2013.01); *H04L 63/1416* (2013.01); *H04L 26/06* (2013.01); *H04L 61/3025* (2013.01)
USPC ............................................ 726/22; 709/206

(58) Field of Classification Search
CPC ..................... H04L 63/1483; H04L 29/12594; H04L 61/30; H04L 63/1441; H04L 61/3025; G06F 17/28; G06F 17/2872; G06F 21/00; G06F 21/562
USPC ......................................................... 726/22
See application file for complete search history.

(56) References Cited

U.S. PATENT DOCUMENTS

| 7,559,085 B1* | 7/2009 | Wahl ............................. 726/22 |
| 7,644,127 B2* | 1/2010 | Yu ................................. 709/206 |
| 7,698,442 B1* | 4/2010 | Krishnamurthy et al. ..... 709/229 |
| 2006/0123464 A1* | 6/2006 | Goodman et al. ................ 726/2 |
| 2008/0172738 A1* | 7/2008 | Bates et al. ..................... 726/22 |

OTHER PUBLICATIONS

Fu et al., The Methodology and an Application to Fight against Unicode Attacks, Symposium on Usable Privacy and Security (SOUPS) 2005, Jul. 12-14, 2006, Pittsburgh, PA, USA.*
Abbasi, Ahmed, and Hsinchun Chen. "A Comparison of Tools for Detecting Fake Websites." IEEE Journals & Magazines, Computer, vol. 42, Issue: 10, pp. 78-86 [2009].*
Fu, Anthony Y. et al., "The Methodology and an Application to Fight against Unicode Attacks," downloaded from web site http://cups.cs.cmu.edu/soups/2006/proceedings/p91_fu.pdf on Aug. 5, 2008.

* cited by examiner

*Primary Examiner* — Taghi Arani
*Assistant Examiner* — Narciso Victoria
(74) *Attorney, Agent, or Firm* — Wilmer Cutler Pickering Hale and Dorr LLP (57) ABSTRACT

A method and apparatus for identifying domain name abuse in web-based content is described. In one embodiment, the method for identifying domain name abuse in web-based content to secure a computer comprising processing a first domain name and modifying the first domain name using a at least one rule for replacing characters. The modified first domain name indicates an imitation of a second domain name by the first domain name.

20 Claims, 5 Drawing Sheets

METHOD AND APPARATUS FOR IDENTIFYING DOMAIN NAME ABUSE

BACKGROUND

1. Technical Field

Embodiments of the present invention generally relate to computer network security systems and, more particularly, to a method and apparatus for securing computer systems from domain name abuse.

2. Description of the Related Art

Over the last few decades, a large percentage of the world's population has incorporated the internet into their daily lives. Many business and personal transactions occur on the Internet. Many businesses have created Internet websites as an integral part of their marketing efforts to inform consumers of the products or services offered by the businesses and provide other information seeking to engender brand loyalty. These websites further allow Internet users to do online shopping. The Internet has become increasingly popular as a medium for commercial transactions.

The fraudsters, for example, spammers, phishers and hackers employ different techniques to disrupt operations at a computer of the Internet user by acquiring the confidential information from the computer. For example, the fraudsters entice the Internet users to navigate fraudulent websites which resemble legitimate websites in order to obtain the confidential information, for example, passwords and/or financial account information.

The fraudsters may employ various visual characteristics of real domain names of the legitimate websites to mask domain names of the fraudulent websites and thus avoid detection. For example, similarities between letters or groups of letters are used to disguise the domain name of the fraudulent website. The hacker or fraudster may register the domain name of the fraudulent website which looks just like that of the legitimate website, but some of the letters have been replaced by homographs in another alphabet. The fraudster may then send messages, purported to come from the original legitimate website, but directs the Internet users to the fraudulent website. Then, the fraudulent website records information such as passwords or account details and other such private and personal data of the Internet user. The Internet users may never notice the difference, until suspicious or criminal activity occurs with their accounts. For example, the string 'w' resembles the string 'vv'. An Internet user may not notice such a subtle difference and click on a link for 'www.vvellsfargo.com' by accident. Sometimes, punctuation marks in the domain name may also be detected.

Current spam and phish detection techniques may not operate properly if look-alike characters are used. For example, such a detection technique may not recognize a string of characters 'vvellsfargo.com' as the fraudulent domain name of the real domain name 'wellsfargo.com' and therefore, does not block emails or web pages having such a string. Therefore, the confidential information is captured by the fraudulent website and misuse or theft (e.g., illegal money transfer by the fraudster from bank account websites) may occur.

Accordingly, there is a need in the art for method and apparatus for identifying domain name abuse to support web-based fraud detection and computer security.

SUMMARY

Embodiments of the present invention comprise a method and system for identifying domain name abuse. In one embodiment, the method comprises processing a first domain name and modifying the first domain name using at least one rule for replacing characters in the first domain name where the modified first domain name indicates an, imitation of the second domain name by the first domain name.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
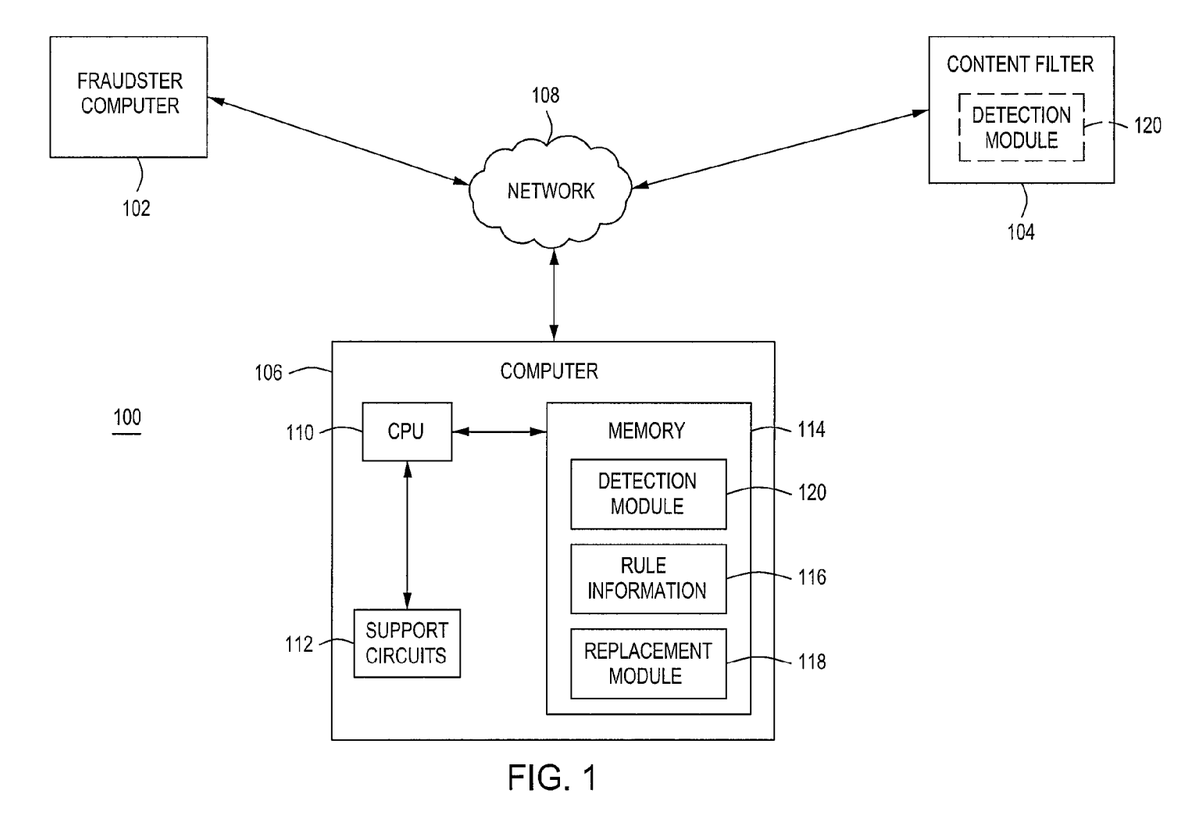
FIG. 1 is a block diagram of a system for detecting web-based fraud to secure a computer according to an embodiment of the present invention.

FIG. 1 illustrates a system 100 for detecting web-based fraud to secure a computer. The system 100 comprises a fraudster computer 102, a content filter 104, a computer 106 and each is coupled to each other through a network 108.

The fraudster computer 102, herein, may be a computing device that is configured to employ various spamming and/or phishing techniques in order to transmit malicious web-based content to various Internet users. The fraudster computer 102 may utilizes the various spamming and/or phishing techniques to lure Internet users into accessing (e.g., downloading) the malicious web-based content. Such malicious web-based content (e.g., web pages and/or emails) may include one or more first characters in a string for a fraudulent domain name that are similar in appearance to a string of characters for a legitimate domain name associated with an actual commercial brand. As a result, Internet users may be under the assumption that the fraudulent domain name is the legitimate domain and unknowingly interact with malicious web pages and/or emails.

The content filter 104 is any one of the content filters generally known in the art. The content filter 104 may be a gateway appliance, a web proxy or a browser component which processes the web-based content intended for the computer 106. The content filter 104 is configured to identify a first domain name within the web-based content, for example, an email message or a website. The first domain name refers to a domain name of the website or the email which may be fraudulent. Optionally, the content filter 104 comprises a detection module 120, as described further below.

The computer 106 may be a computing device such as a server, a desktop computer, a laptop, a mobile computing device (e.g., cell phones and Personal Digital Assistants (PDAs)), and the like. The computer 106 comprises a central processing unit (CPU) 110, various support circuits 112 and a memory 114. The CPU 110 may comprise one or more commercially available microprocessors or microcontrollers that facilitate data processing and storage. Alternatively, the CPU 110 may include one or more application specific integrated circuits (ASIC). Various support circuits 112 facilitate operation of the CPU 110 and may include clock circuits, buses, power supplies, input/output circuits and/or the like. The memory 114 includes a read only memory, random access memory, disk drive storage, optical storage, removable storage, and the like. The memory 114 includes various data, such as rule information 116. The memory 114 includes various software packages, such as a replacement module 118 and the detection module 120.

The network 108 comprises a communication system that connects computers by wire, cable, fiber optic, and/or wireless links facilitated by various types of well-known network elements, such as hubs, switches, routers, and the like. The network 108 may employ various well-known protocols to communicate information amongst the network resources. For example, the network 108 may be part of the Internet or intranet using various communications infrastructure such as Ethernet, WiFi, WiMax, General Packet Radio Service (GPRS), and the like.

The rule information 116 comprises one or more rules for replacing various characters of the first domain name. Each rule refers to one or more first characters that may be used to imitate one or more second characters of the legitimate domain name. In one embodiment, a rule that is defined in the rule information 116 may be a homographic replacement rule, a punctuation replacement rule, a foreign language replacement rule and/or a character insertion replacement rule. The replacement module applies the one or more rules to the first domain name to produce the second domain name by modifying the first domain name. In one embodiment, the application of a particular rule modifies the first domain name by replacing and/or removing the one or more first characters. Similarities between the second domain name and the first domain name may indicate the legitimate web site being spoofed.

The replacement module 118 is configured to modify the first domain name in accordance with the rule information 116. Further, the replacement module 118 modifies the first domain name by replacing one or more first characters of the first domain name with one or more second characters, wherein the one or more first characters are an imitation of the one or more second characters. According to another embodiment of the present invention, the replacement module 118 is further configured to modify the first domain name by removing a portion of the first domain name (e.g., removing the one or more first characters). In yet another embodiment of the present invention, the replacement module 118 converts the modified first domain name into the second domain name and establishes that the first domain name is an imitation of the second domain name.

In one embodiment, the replacement module 118 invokes the homographic replacement rule to replace two or more adjacent characters with one or more homographic characters that are similar in appearance to the two or more adjacent characters. Because the two or more adjacent characters closely resemble the one or more homographic characters, many spamming and phishing techniques exploit such a resemblance to facilitate domain name abuse. For example, the two proximally placed letters 'vv' (i.e., 'v'+'v') are similar in appearance to 'w'. As another example, the substring 'rn' comprising letters 'r' and 'n' is similar in appearance to the letter 'm'. As such, the replacement module 118 examines the strings for the first domain names 'vvellsfargo' and 'monster' and recognizes the strings 'vv' and 'rn', respectively. Then, the replacement module 118 modifies the strings for the first domain names to produce the strings 'wellsfargo' and 'monster' for the second domain names. As described further below, the detection module 120 examines the strings for the second domain names and identifies the brands being spoofed to be well-known bank WELLSFARGO and Internet employment service MONSTER.COM.

In another embodiment, the replacement module 118 invokes the punctuation replacement rule to replace a punctuation mark with a character that resembles the punctuation mark. For example, the mark '|' (pipe symbol) is similar in appearance to the letter 'I' (I for Itinerary), the letter 'l' (l for lamp) as well as the number '1'. As another example, the dollar sign symbol '$' looks like the letter 'S'. As such, a dollar symbol ('$') character within a string for the first domain name 'well$fargo' is to be replaced by a letter 's' to create string 'wellsfargo'. In operation, the replacement module 118 identifies a particular punctuation mark (e.g., the pipe symbol) within the string for the first domain name and replaces the particular punctuation mark with a character that is similar in visual representation (e.g., the letter 'I', the letter 'l' and/or the number '1'). For instances, the string for the first domain name 'paypal' is modified to produce the strings for the second domains names 'paypal', 'paypal' and/or 'paypal'. Based on the strings for the second domain names, the detection module 120 determines that the well-known financial web site PAYPAL is the brand being spoofed.

In another embodiment, the replacement module 118 invokes the foreign language rule to replace one or more proximally placed foreign language characters that are similar in appearance to one or more native language (i.e., English) characters. For example, the foreign character 'ą' is similar in appearance to the English letter 'a'. In yet another example, the foreign language characters 'â', 'Ô', 'Ç', 'ß', 'Ğ', 'Ø', 'Z', 'Θ', 'X', 'K', 'Ш' are similar in appearance to the characters 'a', 'O', 'C', 'B', 'G', 'O', Y Z O X K W', respectively. In one embodiment, the foreign language rule includes a rule or a condition regarding when to use the foreign language rule. For example, if the foreign character 'ą' is immediately followed by the letter 't', as in 'at', then the foreign language rule may be used to replace character 'ą': with the character 'a'. For instance, the replacement module 118 recognizes the foreign language character 'ą' in a string for the first domain name 'ątt' and uses the native language character 'a' to replace the foreign language character 'ą' and modify the string for the first domain name into 'att'. Accordingly, the detection module 120 examines the modified string for the first domain name and identifies the brand being spoofed by the first domain name to be the well-known telecommunications company AT&T.

In yet another embodiment, the replacement module 118 invokes the character insertion replacement rule to replace one or more characters that may be inserted or removed without any significant difference to the appearance of a string. For example, string 'abcd . . . z' is similar in appearance to string 'abcd . . . z' where the only difference is an additional punctuation mark '.' (period) in the latter string. As another example, 'www.wellsfargo.com' is similar in appearance to 'www.wells.fargo.com'. In operation, the replacement module 118 recognizes the punctuation mark '.' in the first domain name 'wells.fargo' and automatically removes the period to produce the second domain name 'wellsfargo'. As described further below, the detection module 120 examines the second domain name 'wellsfargo' to identify the brand being spoofed to be the well-known bank WELLSFARGO.

The detection module 120 (e.g., SPAM filter, PHISH filter and the like) is configured to monitor network activity within a computer or a system of computers to detect web-based fraud, such as SPAM and/or PHISH, based upon an imitation of a second domain name (i.e., legitimate domain name) by a first domain name within web-based content (e.g., a web page, an email, an instant message, a multimedia file and the like). In one embodiment, the detection module 120 may identify a brand being spoofed from a string for the first domain name that has been modified in accordance with the rule information 116. The detection module 120 uses the identified brand to determine if a web page or an email is to be classified as malicious (i.e., SPAM or PHISH). According to an embodiment of the present invention, the detection module 120 analyzes the web-based content using the modified string for the first domain name and determines that the web-based content comprises spam and/or phish).

According to various embodiments of the present invention, the detection module 120 and the replacement module 118 cooperate to classify web-based content as malicious or safe (i.e. benign). The replacement module 118 may be a feature or a component incorporated within the detection module 120 that analyzes the web-based content for domain name abuse using the rule information 116. In one embodiment, the one or more rules of the rule information 116 is applied to a first domain name in order to detect domain name abuse. For example, if the detection module 120 identifies a brand and/or a legitimate web site being spoofed, then there is a strong likelihood of domain name abuse within the web-based content. The rules actually used to modify the first domain name indicate the domain name abuse techniques employed within the web-based content. The detection module 120 evaluates information regarding such domain name abuse techniques when formulating a decision about whether to classify the web-based content as malicious or benign.

It is understood here that the detection module 120 includes spam or phish filters, such as those generally known in the art, which may not detect a brand being spoofed or domain name abuse from the first domain name because of the use of look-alike characters. Advantageously, as provided according to various embodiments of the invention, such spam or phish filters have a much higher probability of blocking spam or phish with information regarding the brand being spoofed and/or domain name abuse (i.e., the second domain name being imitated by the first domain name).

For example, a web page or an email that comprises a first domain name 'www.vvellsfargo.com' is processed by the content filter 104. The replacement module 118 replaces 'vv' in 'vvellsfargo.com' with 'w' to produce 'wellsfargo.com' as a second domain name in a copy of the web page or the email using the rule information 116. The detection module 120 may identify the brand (WELLSFARGO) that is being imitated by the first domain name ('vvellsfargo.com') based on the second domain name ('wellsfargo.com'). The detection module 120 may classify the web page or the email as malicious based on information regarding one or more techniques used to abuse a legitimate domain name ('wellsfargo.com') for the brand WELLSFARGO. In another embodiment of the present invention, the detection module 120 applies a machine learning technique to the copy of the web page or the email to identify the domain name 'wellsfargo.com' for the brand WELLSFARGO. According to yet another embodiment of the present invention, the detection module 120 may classify the web page or the email as malicious based on information which indicates that 'wellsfargo.com' is a legitimate website which is often spoofed by the fraudsters. Subsequently, the content filter 104 may block the web page or the email from being transmitted to the computer 106.

Figure 2:
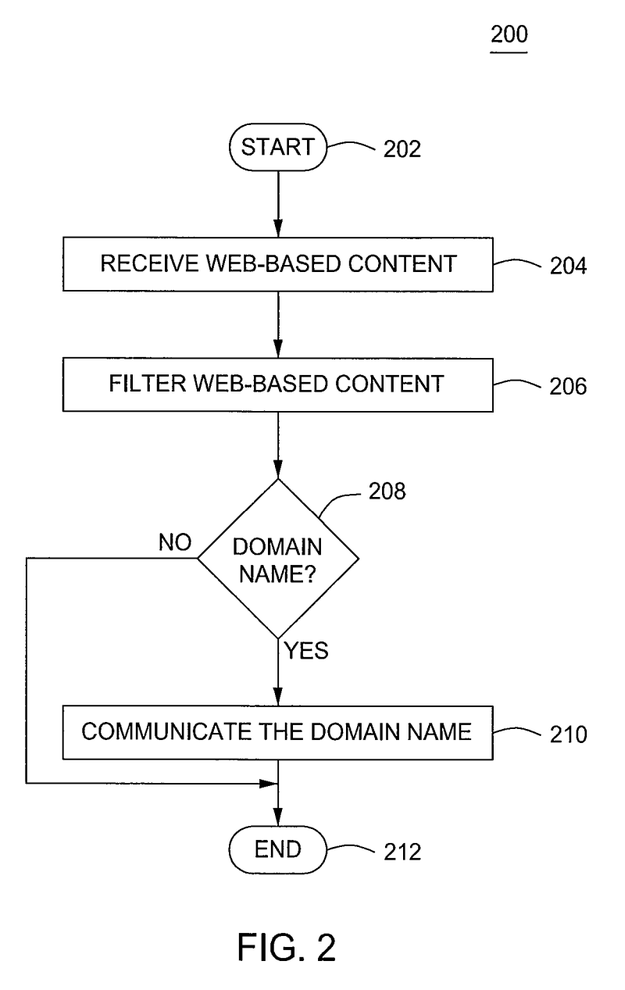
FIG. 2 is a flow diagram of a method for processing web-based content, according to an embodiment of the present invention.

FIG. 2 illustrates a method 200 for processing web-based content. The method 200 starts at step 202 and proceeds to step 204, at which the web-based content (e.g., web pages, emails and/or the like) is received.

At step 206, the web-based content is filtered. At step 208, a determination is made as to whether a domain name is identified in the web-based content. If the domain name is not identified (option 'NO'), then the method 200 proceeds to step 212. If the domain name is identified (option 'YES'), then the method 200 proceeds to step 210. At the step 210, the domain name is communicated (e.g., to the computer 106 of FIG. 1). The method 200 ends at the step 212.

According to an embodiment of the present invention, a website 'www.rnoney.com' may be registered by a fraudster computer (e.g., the fraudster computer 102). The fraudulent domain name of the website is 'rnoney.com' which comprises malicious web-based content. The legitimate domain name is 'money.com'. In the fraudulent domain name, the characters 'rn' are replaced by the character 'm' to produce the legitimate domain name 'money.com'. The fraudster computer uses the similarity between 'rn' and 'm' to trick the user. The content filter (e.g., the content filter 104) processes and filters the malicious web-based content associated with the fraudulent domain name 'rnoney.com'. The domain name 'rnoney.com' is identified within the web pages or emails. Next, the domain name is 'money' is communicated to a replacement module (e.g., the replacement module 116), as described further below.

Figure 3:
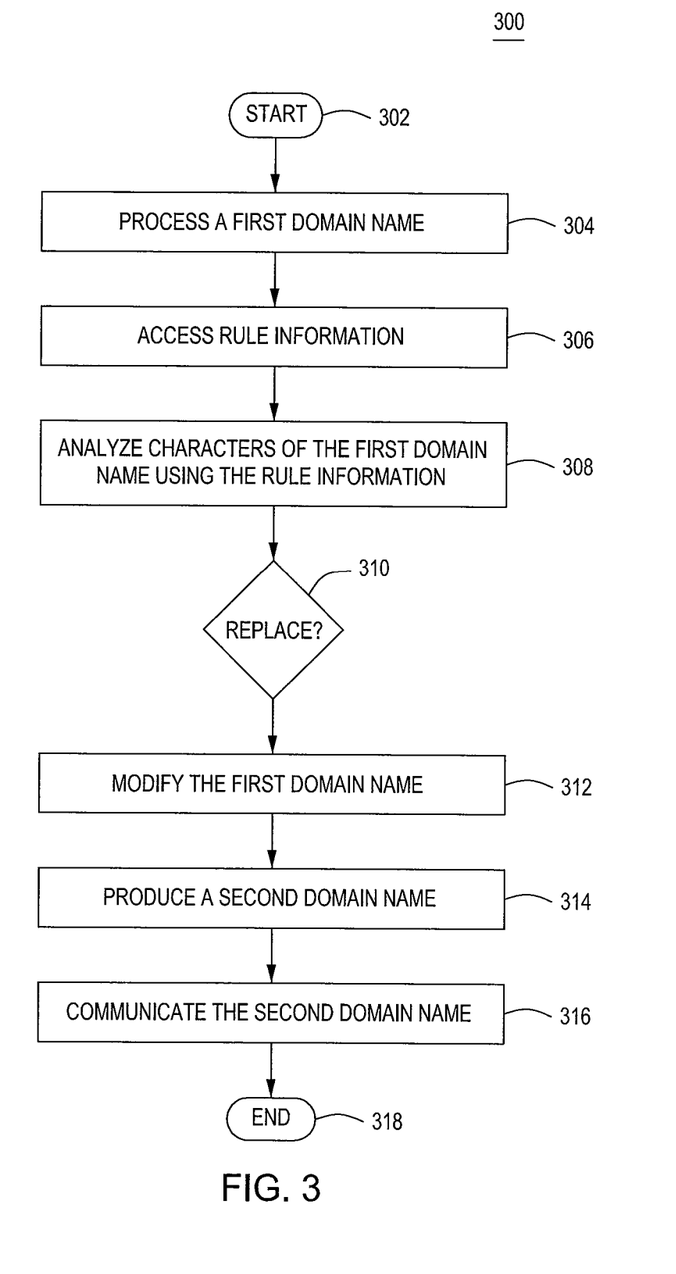
FIG. 3 is a flow diagram of a method for modifying a first domain name according to an embodiment of the present invention.

FIG. 3 is a flow diagram of a method 300 for modifying a first domain name. The first domain name is the domain name of the fraudulent website or the email. The method 300 starts at step 302, and proceeds to step 304.

At step 304, the first domain name is processed (e.g., by the replacement module 118 of FIG. 1). As mentioned above, the content filter filters web-based content to determine the first domain name. At step 306, rule information (e.g., the rule information 116 of the FIG. 1) is accessed. At step 308, characters of the first domain name are analyzed using the rule information. At step 310, a determination is made as to whether one or more of the characters of the first domain name are to be replaced. If one or more of the characters of the first domain name are not to be replaced (option 'NO'), then the method 300 proceeds to end at step 318. If the characters of the first domain name are needed to be replaced (option 'YES'), then the step 310 proceeds to step 312. At the step 312, the first domain name is modified. At step 314, a second domain name is produced from the modified first domain name. The second domain name is the domain name which is produced by replacing or removing characters in the first domain name, using the one or more rules defined in the rule information 116. At step 316 the second domain name is communicated. The method 300 ends at the step 318.

Figure 4:
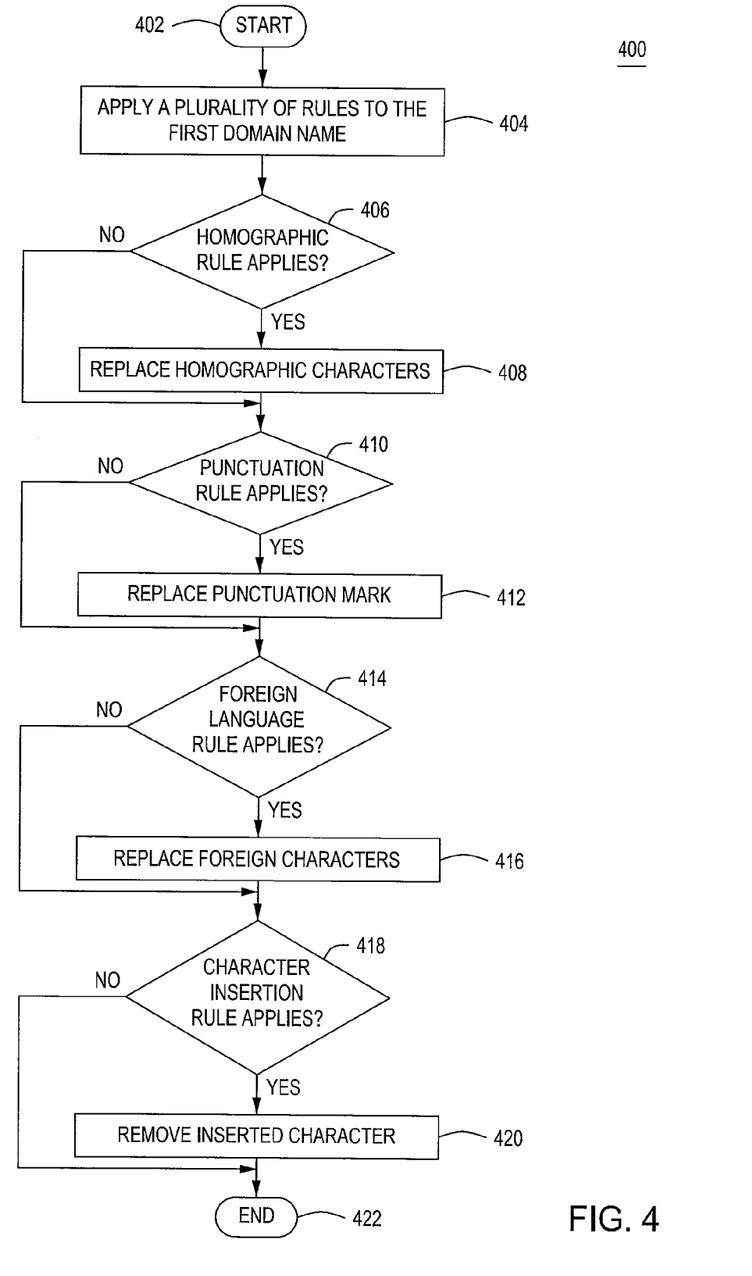
FIG. 4 is a flow diagram of a method for applying at least one rule to a first domain name according to an embodiment of the present invention.

FIG. 4 is a flow diagram of a method 400 for applying multiple rules to the first domain name. The method 400 starts at step 402 and proceeds to step 404, at which the one or more rules is applied on the first domain name.

At step 406, a determination is made as to whether a homographic rule is applied to the first domain name. If the homographic rule is applied to the first domain name (option 'YES'), the method 400 proceeds to step 408. At step 408, the replacement module 120 replaces a first homographic character of the first domain name with a second homographic character. For example, characters 'vv' of the first domain name would be replaced by character 'w'. At step 406, however, if the homographic rule is not applied by the replacement module 120 to the first domain name (option 'NO'), the method 400 proceeds to step 410.

At step 410, a determination is made as to whether a punctuation rule is applied by the replacement module 120 to the first domain name. If the punctuation rule is applied to the first domain name (option 'YES'), the method 400 proceeds to step 412. At step 412, a punctuation mark of the first domain name is replaced with a character that resembles the punctuation mark. The punctuation mark is most likely used to imitate the character. For example, a pipe symbol ('|') character of the first domain name is replaced by the character letter 'l' and a dollar symbol ('$') characters of the first domain name is replaced by the character letter 'S'. At step 410, however, if the punctuation rule is not applied to the first domain name (option 'NO'), the method 400 proceeds to step 414.

At step 414, a determination is made as to whether a foreign language rule is applied to the first domain name. If the foreign language rule is applied to the first domain name (option 'YES'), the method 400 proceeds to step 416. At step 416, a foreign character of the first domain name is replaced with a native language character. For example, an 'â' character of the first domain name is replaced by the character 'a', a 'Ô' character of the first domain name is replaced by the character 'O', a 'Ç' character of the first domain name is replaced by the character 'C', a 'ß' character of the first domain name is replaced by the character 'B', a 'Ğ' character of the first domain name is replaced by the character 'G', a 'Ø' character of the first domain name is replaced by the character 'O', a 'Y' character of the first domain name is replaced by the character 'Y', a 'Ө' character of the first domain name is replaced by the character 'O', a 'Ш' character of the first domain name is replaced by the character 'W' and the like. At step 414, however, if the foreign language rule is not applied to the first domain name (option 'NO'), the method 400 proceeds to step 418.

At step 418, a determination is made as to whether a character insertion rule is applied to the first domain name. If the character insertion rule is applied by the replacement module 120 to the first domain name (option 'YES'), the method 400 proceeds to step 420. At step 420, removing the inserted character is removed from the first domain name. For example, a character '.' that is inserted in 'www.wells.fargo.com' is removed according to the character insertion rule that results in the second domain name 'www.wellsfargo.com'. As another example, a character '-' that is inserted in 'www-.wells-fargo.com' is removed and results in the second domain name 'www.wellsfargo.com'. At step 418, however, if the character insertion rule is not applied by the replacement module 120 to the first domain name (option 'NO'), the method 400 proceeds to step 422. At step 422, the method 400 ends.

In one embodiment, for example, a web page 'www.rnon.ster.com' is registered by the fraudster. The Internet user wants to access the legitimate website 'www.monster.com'. However, for some reason the Internet user accesses the fraudulent website 'www.rnonster.com'. The first domain name 'rnon.ster' is identified by the content filter 104 and is sent to the computer, for example, the computer 106. The characters of the first domain name of the fraudulent website are identified and are compared with the multiple set of rules defined in the rule information module, for example, the rule information 116 of the FIG. 1. The first domain name is seen for the homographic characters. The first domain name 'rnon.ster' includes two homographic characters 'r' and 'n' in place of 'm'. The 'r' and 'n' are replaced with the 'm' by the replacement module, for example, the replacement module 118. Then, the first domain name is seen for the punctuation rule. The first domain name 'rnon.ster' includes the punctuation mark '.'. The punctuation mark '.' is removed from the first domain name or replaced with a look-alike character. After replacing or removing the look-alike characters of the fraudulent domain name, the web sites that spoof the website 'monster.com' are provided to the spam and/or phish detection technique.

Figure 5:
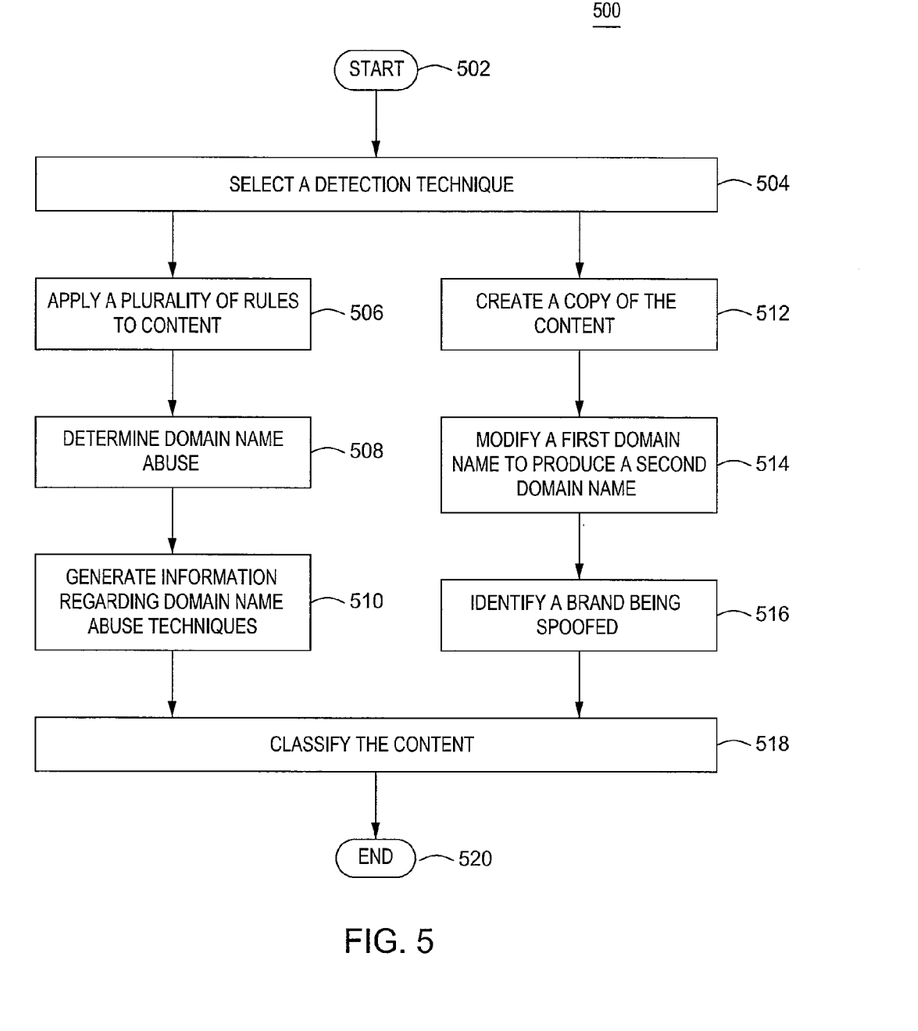
FIG. 5 is a flow diagram of a method for detecting web-based fraud to secure a computer according to an embodiment of the present invention.

FIG. 5 illustrates a method 500 for detecting a web-based fraud to secure a computer. The method 500 starts at step 502 and proceeds to step 504, at which a detection technique is selected. In one embodiment, method 500 may be performed by the detection module 120 of FIG. 1 and/or the content filter 102 of FIG. 1.

As explained above, steps 506-510 form a first detection technique. At step 506, a plurality of rules (i.e., replacement rules) is applied to web-based content. At step 508, domain name abuse within the web-based content is determined. More specifically, the domain name abuse is identified by the application of the replacement rules to the web-based content, as discussed earlier. At step 510, information regarding domain name abuse techniques is generated.

As explained above, steps 512-516 form a second detection technique. At step 512, a copy of the web-based content is created. At step 514, at which the first domain name is modified to produce with the second domain name. At step 516, a brand being spoofed by the first domain name is identified. In another embodiment, the step 516 may be performed by the content filter 104, and in yet another embodiment, the step 516 may be performed by spam or phishing detection filters/mechanisms, such as those generally known in the art (e.g., the detection module 120 of FIG. 1). The method 500 ends at step 518.

The various embodiments discussed herein provide enhanced security for the Internet users carrying out online transactions. For example, the different embodiments disclosed herein prevent personal information leakage and therefore, further prevents various monetary and other risks which may occur to the Internet user. The additional security features allow Internet users to feel more secure while carrying out online transactions. Further, the techniques and embodiments discussed herein provide enhanced effectiveness to known spam or phishing detection filters, and further provide new ways in which to identify and prevent spam or phish.

While the foregoing is directed to embodiments of the present invention, other and further embodiments of the invention may be devised without departing from the basic scope thereof, and the scope thereof is determined by the claims that follow.

The invention claimed is:

1. A method for identifying domain name abuse in web-based content to secure a computer, comprising:
    processing, using at least one computer processor, web-based content to identify a first domain name;
    modifying the first domain name using at least one rule for replacing characters to produce a second domain name, wherein the modified first domain name indicates that the first domain name is an imitation of the second domain name and the second domain name is associated with a brand being imitated by the first domain name;
    identifying the brand being imitated by the first domain name that is associated with the second domain name; and
    classifying web-based content as fraud based at least in part on the identified brand.

2. The method of claim 1, wherein modifying the first domain name further comprises replacing at least one first character of the first domain name in accordance with the at least one rule to produce the second domain name, wherein the at least one first character is used to imitate the second domain name.

3. The method of claim 2, wherein modifying the first domain name further comprises replacing the at least one first character of the first domain name with at least one second character, wherein the at least one first character is an imitation of the at least one second character.

4. The method of claim 3, wherein the at least one first character comprises a punctuation mark, wherein the punctuation mark is used to imitate a portion of the at least one second character.

5. The method of claim 3, wherein the at least one first character and the at least one second character are homographic.

6. The method of claim 3, wherein the at least one first character is defined by a foreign language and the at least one second character is defined by a native language.

7. The method of claim 2, wherein modifying the first domain name further comprises removing a portion of the at least one first character from the first domain.

8. The method of claim 1, wherein modifying the first domain name further comprises converting the modified first domain name into the second domain name.

9. The method of claim 1 further comprising detecting web-based fraud using the second domain name.

10. The method of claim 1 further comprising analyzing a web page using the second domain name to identify Phish.

11. The method of claim 1 further comprising analyzing message data using the second domain name to identify at least one of SPAM or Phish.

12. The method of claim 1, wherein processing the first domain name further comprises filtering web-based content to identify the first domain name.

13. The method of claim 1 further comprising training a web-based fraud detection technique using the second domain name, wherein training a web-based fraud detection technique using the second domain name comprises applying a machine learning technique to identify the second domain name, the second domain name being associated with the brand.

14. An apparatus for identifying domain name abuse in web-based content to secure a computer, comprising:
 a memory comprising a rule information module having at least one rule for replacing characters to modify a first domain name;
 a replacement module for:
  converting the first domain name into a second domain name using the at least one rule, wherein the first domain name is an imitation of the second domain name and the second domain name is associated with a brand being imitated by the first domain name;
  identifying the brand being imitated by the first domain name that is associated with the second domain name; and
  classifying web-based content as fraud based at least in part on the identified brand.

15. The apparatus of claim 14, wherein the rule information comprises a rule for replacing a first punctuation mark in the first domain name, wherein the first punctuation mark is used to imitate the second domain name.

16. The apparatus of claim 14, wherein the rule information comprises a rule for replacing at least one first homographic character with at least one second homographic character, wherein the at least one first homographic character is used to imitate the at least one homographic character.

17. The apparatus of claim 14, wherein the rule information comprises a rule for replacing a foreign language character in the first domain name with a native language character, wherein the foreign language character is used to imitate the native language character.

18. The apparatus of claim 14, wherein the rule information comprises a rule for removing a first character of the first domain name, wherein the removed first character is used to imitate the second domain name.

19. A system for identifying domain name abuse in web-based content to secure a computer, comprising:
 at least one computer processor configured to:
  process web-based content to identify a first domain name;
  modify the first domain name according to rule information having at least one rule for replacing characters to modify;
  transform the modified first domain name into a second domain name, wherein the first domain name is an imitation of the second domain name and the second domain name is associated with a brand being imitated by the first domain name;
  identify the brand being imitated by the first domain name that is associated with the second domain name; and
  determine web-based fraud associated with the web-based content based on the imitation of the second domain name by the first domain name and based on the identified brand; and
 at least one memory, coupled to the at least one computer processor, configured to provide the at least one computer processor with instructions.

20. The system of claim 19, wherein the detection module classifies the web based content using the second domain name.

* * * * *